Oct. 6, 1953  B. M. HYMAN  2,654,201
COTTON STRIPPING MACHINE
Filed Sept. 9, 1950  4 Sheets-Sheet 1
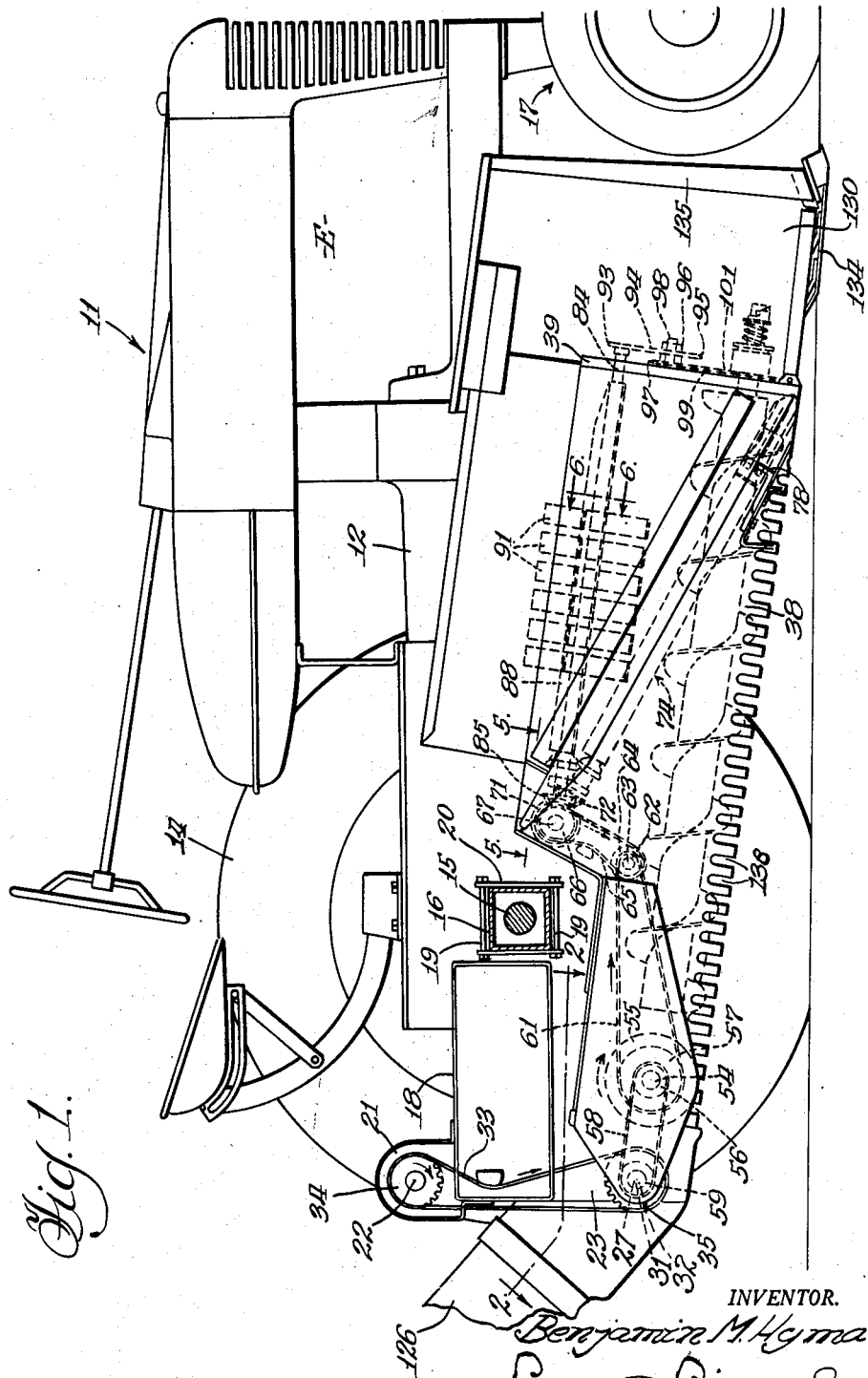
INVENTOR.
Benjamin M. Hyman
Paul O. Pippel
Atty.

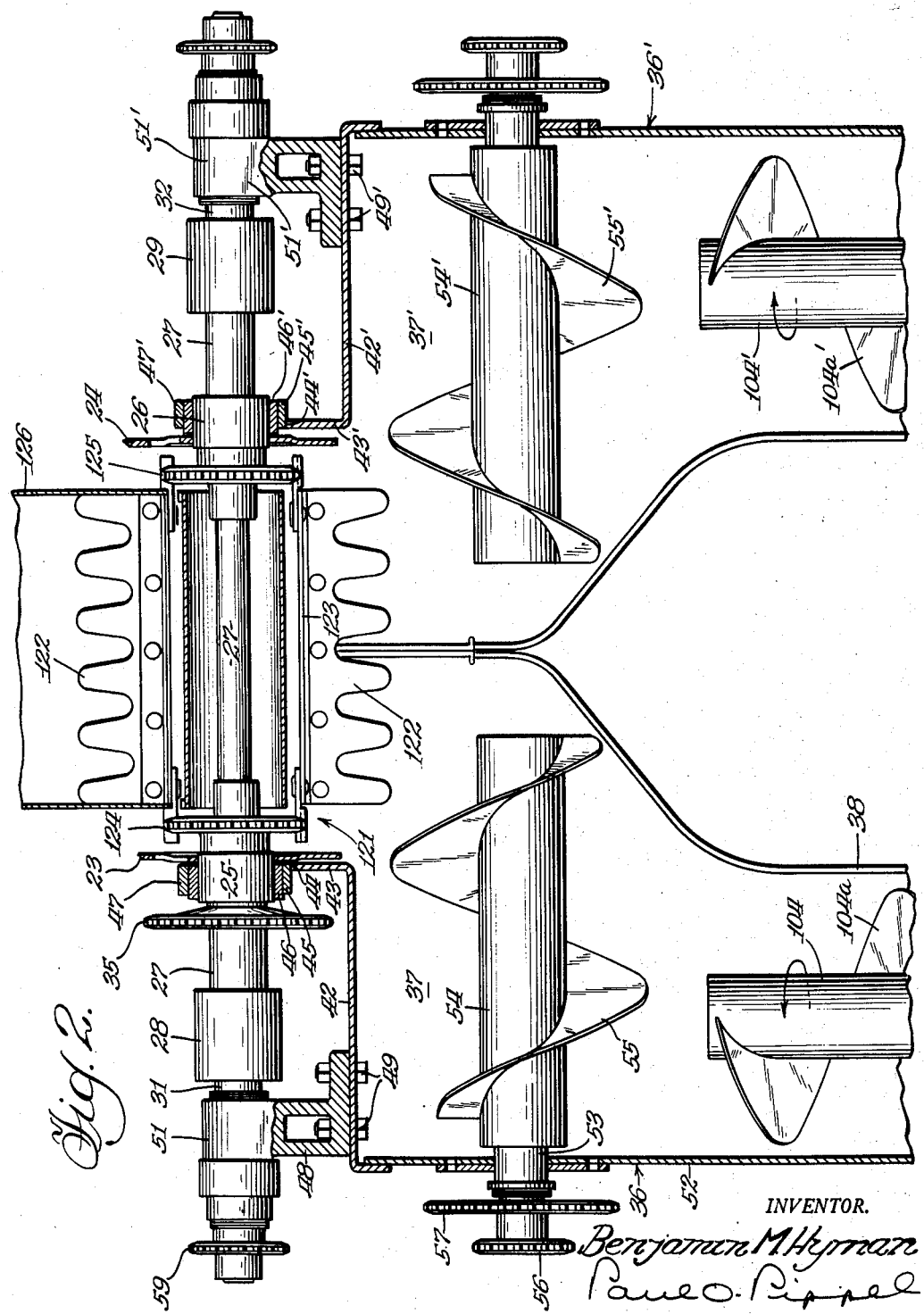

Oct. 6, 1953 B. M. HYMAN 2,654,201
COTTON STRIPPING MACHINE
Filed Sept. 9, 1950 4 Sheets-Sheet 3
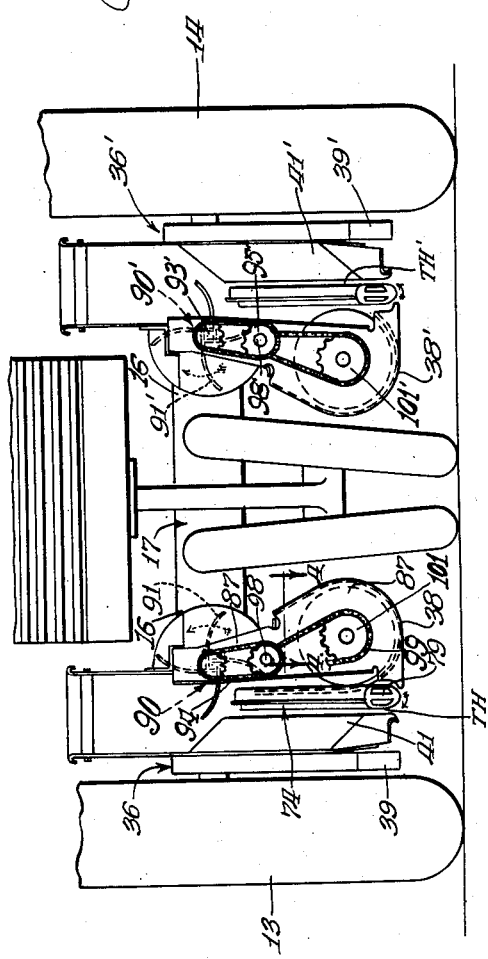
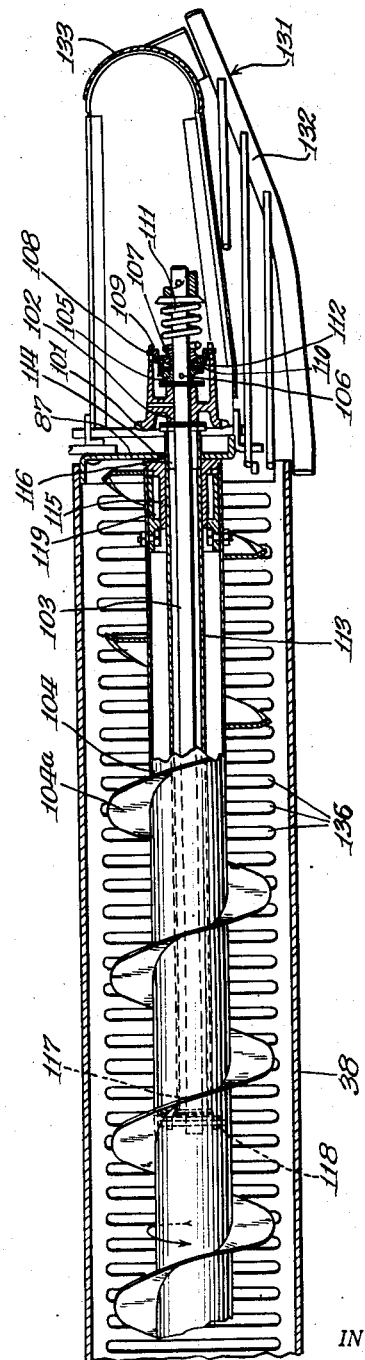
INVENTOR.
Benjamin M. Hyman

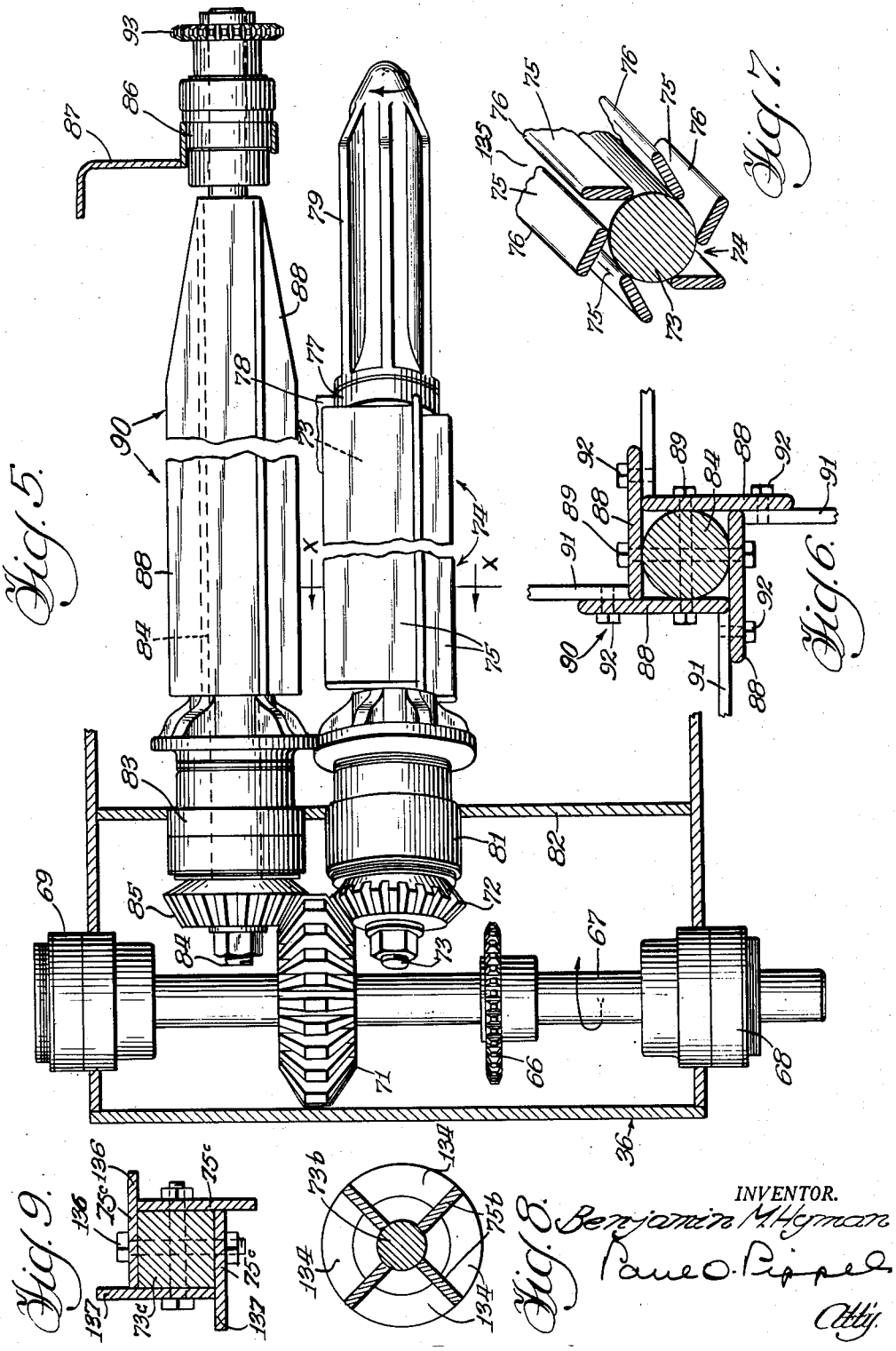

UNITED STATES PATENT OFFICE 2,654,201

COTTON STRIPPING MACHINE

Benjamin M. Hyman, Moline, Ill., assignor to International Harvester Company, a corporation of New Jersey Application September 9, 1950, Serial No. 184,068

6 Claims. (Cl. 56—29)

This invention relates to machines for stripping lint-bearing bolls from cotton plants in the field and relates more in particular to improvements in mechanism for operating upon the bolls for removing them from the plants.

One type of presently used cotton stripping machine employs a plant-row following frame having a plant receiving throat wherein there is at least one upwardly and rearwardly inclined stripper roller upon one side of the throat cooperating with a complemental upwardly and rearwardly inclined surface for compressing the cotton plants as the machine is advanced along the row. There are plant combing fingers on the stripping roller. By compressing the plants progressively upwardly while the combing fingers of the roller are carried through the plants the cotton bolls are squeezed or combed from the plants and thereafter guided into conveyor means for transferring the bolls into a receptacle or trailer vehicle moving across the field with the stripping machine. These contemporary machines necessarily crush many of the plant stems and break off pieces thereof which are conveyed from the machine along with the lint filled bolls. It is desired, of course, to avoid accumulation of trash with the bolls and it is an object of the present invention to provide a stripping machine adapted to operate upon the plants and bolls in a manner decreasing the amount of trash gleaned with the bolls. Cotton stripping machines are employed in those areas where there is comparatively little rainfall and prevailing winds of higher velocity than in the area where cotton pickers are used. Cotton pickers are constructed to avoid injuring the cotton plants and particularly immature bolls which are allowed to remain on the plants during initial picking when the first-to-mature lint is harvested. The species of cotton harvested by the cotton stripper machine matures without the boll opening up wherefore it is possible to wait until all of the bolls mature before harvesting any of the crop so that it does not matter if the plants are destroyed pursuant to harvest. Consequently during harvest of the fully matured boll and plants by cotton stripping machines many of the plant stems and bolls are dehydrated and crisp and therefore more conducive to creating dust and trash for contaminating the cotton lint.

A further object of this invention is the provision of a cotton stripper unit which substitutes for the compressing and combing roller of conventional machines a rotatable beater structure having boll beater means projecting radially thereof for knocking the bolls from the plants. The beater structure minimizes crushing and other impairment of the bolls so that by remaining intact these bolls shield fine dust particles from the cotton lint.

Another object of this invention is the provision of a novel boll transfer structure to assist in the transfer of bolls detached from the cotton plants into a receiving trough of a conveyor extending alongside of the plant-receiving throat of the cotton stripping mechanism.

A further object is the provision of an improved rotatable power transmitting structure for applying rotating force to the front end of an auger in said trough, whereby the rear end of the auger is open-ended to facilitate conveying and discharging of the cotton bolls rearwardly through the trough.

Still another object is the provision of a cotton stripping unit wherein the rotatable boll transferring structure serves as the power transmitting structure for applying rotating force at the front end of the auger.

Other objects inherent in and encompassed by the invention will become apparent from the ensuing description, the appended claims and the annexed drawings, wherein:

Fig. 1 is a side elevational view of a tricycle type farm tractor having the nearest rear traction wheel removed wherefor the right rear axle and axle housing are shown in section, whereby the cotton stripper unit mounted on the tractor and shown in side elevation is exposed.

Fig. 2 is a fragmentary horizontal sectional view taken on an enlarged scale substantially on the line 2—2 of Fig. 1, showing the auger trough arrangement, an elevator, and shafts with sprockets for transmitting power to stripping units mounted upon respective sides of the tractor.

Fig. 3 is an elevational view showing the lower part of the tractor from the front, and a front elevational view of two stripping units mounted upon the tractor to occupy positions at respective sides of the tractor body, there being omitted from this view vine lifter and divider mechanisms shown on the front end of the stripper unit in Fig. 1.

Fig. 4 is a horizontal sectional view taken on an enlarged scale approximately at the plane indicated by the line 4—4 in Fig. 3, and fragmentarily showing one of the auger troughs together with a portion of the auger therein and showing, in section, a bearing support and slip clutch drive for the auger.

Fig. 5 is a horizontal sectional view on an enlarged scale taken through the casing of the stripping unit on the right side of the tractor at the plane indicated by the line 5—5 in Fig. 1 and showing fragments of the boll beater structure and of the boll transfer structure, together with miter gear driving means therefor.

Fig. 6 is an enlarged transverse sectional view taken through the boll transfer mechanism at the plane indicated by the line 6—6 in Fig. 1.

Fig. 7 is an enlarged perspective view showing a portion of the boll beater structure of Fig. 5.

Fig. 8 is an enlarged transverse sectional view illustrating a modified type of boll beater rotor structure and taken at a plane with respect thereto as that indicated by the line x—x, Fig. 5, with respect to the beater structure 74.

Fig. 9 is an enlarged transverse sectional view of a further modified form of rotor structure having boll beater means thereon and also taken at a plane with respect to such structure as that indicated by the line x—x, Fig. 5, with respect to the beater structure 74.

Referring now to Fig. 1, the tricycle type farm tractor 11 upon which the cotton stripping apparatus is mounted has a central body portion 12, rear traction wheels 13 and 14 (13 being shown in Fig. 3), driving axles 15 for such wheels and axle housings 16 enclosing such axles. A steering truck 17 supports the front end of the vehicle body and engine E thereon.

A carrying frame 18 is supported rearwardly of the tractor body where it is secured by means of bolts 19 and bars 20 to the axle housings 16. This frame 18 supports a gear box 21 from which a driven shaft 22 projects. Gear box 21 receives power from a power take-off tail shaft, not shown, driven from the engine power plants E. Two downwardly extending portions 23 and 24 of the frame 18, Figs. 1 and 2, support roller bearing units 25 and 26, Fig. 2, wherein there is journalled a shaft 27. Opposite ends of this shaft 27 are connected with coupling devices 28 and 29 which serve to constrain shafts 31 and 32 for rotation with the center shaft 27 and in coaxial relation therewith. Power is transmitted to the shaft structure 27—31—32 from the driven shaft 22 of the gear box 21, Fig. 1, through a chain belt 33 which extends over a sprocket 34 on the shaft 22 and a sprocket 35 on the shaft 27.

There are two row-following frames for respective stripper units illustrated in Figs. 2 and 3 for occupying opposite sides of the tractor; the row following frame for the right side of the tractor body is designated 36, whereas the frame at the left side of the body is designated 36'. These frames are essentially identically constructed, the significant differences being that one is shaped for mounting on the left side of the vehicle and the other on the right side thereof. The cotton stripping mechanism associated with each of these frames is likewise essentially identical so that the complete machine with the two frames is adapted to simultaneously strip the bolls from rows of cotton plants at respective sides of the steering truck 17 while the tractor moves lengthwise of these rows. In view of the identical structure of the cotton picker units on the two sides of the tractor, the ensuing description will be directed primarily to the unit on the right side of the tractor and identical reference characters, plus a prime, will be applied to corresponding elements of the unit on the left side of the vehicle where shown.

The stripper unit frame 36 is fabricated from sheet metal. A rear portion of this frame comprises a transfer auger compartment 37 communicative with an auger trough 38 which extends forwardly therefrom. Also extending forwardly from the transfer compartment 37 is a box-like frame element 39, Fig. 3, having a wall structure 41 extending along the inner side thereof. A rear wall 42 of the frame 36, Fig. 2, has a rearwardly turned portion 43 containing an opening 44 in which there is inserted a semi-circular collar 45 which embraces the forward half of a bearing 46 mounted on the outer race of the roller bearing unit 25. A semi-circular collar portion 47 complemental to the portion 46 is detachably assemblable therewith by means of bolts, not shown. Also upon the rear wall 42 of the frame 36 is a bearing bracket 48 secured to said wall by bolts 49. A bearing 51 of this bearing bracket 49 supports the shaft 31.

Forwardly from the rear wall 42 in a wall 52 of the auger trough 38 there is anchored a bearing 53 having a portion of a transverse auger shaft 54 journaled therein. This auger shaft 54 has a helical vane 55 disposed thereabout. Sprockets 56 and 57 are secured to an outer end portion of the shaft 54 and the sprocket 56 is adapted to impart rotating motion to the auger 54—55 and to the sprocket 57 when driven by a chain belt 58, Fig. 1, from a sprocket 59 on the outer end of the shaft 31.

A chain belt 61 is trained over the sprocket 57 and a sprocket 62, Fig. 1, journaled upon a stub shaft 63 mounted upon the frame 36. A second sprocket 64 constrained for rotation with the sprocket 62 is operable through a chain 65 for driving a sprocket 66, Figs. 1 and 5, which is mounted upon and constrained for rotation with a cross shaft 67. Cross shaft 67 is rotatively supported in bearing units 68 and 69, Fig. 5, mounted in side walls of the row-following frame 36.

Also constrained for rotation with the shaft 67 is a double crown pinion 71 having one set of teeth meshed with a beveled pinion 72 mounted upon and constrained for rotation with a shaft 73 of a boll beater rotor instrumentality or structure 74. In Figs. 5 and 7 it can be seen that the rotor structure 74 includes boll beater means in the form of fin-like beater elements or paddles 75 extending lengthwise of the shaft 73 and having an edge secured thereto by welding or other suitable means wherefor these elements 75 have elongated edges 76 extending lengthwise of the rotor structure and projecting radially outwardly from the shaft 73 with respect to the rotor structure axis. A lower end portion of the rotor structure shaft 73 is supported in a bearing 77 formed upon a bracket 78 which is mounted upon a side wall of the auger trough 38; see Fig. 1. The end of the rotor shaft 73 below and forwardly of the bearing 77 has an elongated ribbed point or cap 79 telescopically mounted thereon. The upper end portion of the rotor structure shaft 73 is journaled in a bearing 81 mounted upon a transverse wall 82 of the frame 36.

A second bearing, 83, supported in the frame wall 82 rotatively supports the rear end of a shaft 84 which is constrained for rotation with a pinion 85 thereon meshed with the other set of teeth on the double crown pinion 71. The forward end of the shaft 84 is journaled in a bearing 86 carried in a front end wall 87 of the frame 36. A plurality of beater mounting strips 88, Figs. 5 and 6, extend lengthwise of the shaft 84 and are secured thereto by any standard means as bolts 89. A center portion of a boll transfer and plant beater rotor structure, generally designated 90 and comprising shaft 84 and the strips 88, has the shanks of a plurality of plant beating and brushing elements 91 secured thereto by short bolts 92; see Figs. 3 and 6. These elements 91 extend into a plant accommodating space above the throat TH and beside the side wall 41 where, during rotation of the structure 90, they beat and brush the upper portion of plants whose stalks are in said throat to remove bolls therefrom and transfer these bolls as well as those removed by the rotor structure 74 into the auger trough 38.

The rotor structure 90 constitutes a form of rotatable power transmitting structure for rotating a sprocket 93 on the front end of the shaft 84. In Fig. 1 it can be seen that sprocket 93 is operably connected by a chain 94 with a sprocket 95 on a common hub 96 with a small diameter sprocket 97. The sprocket hub 96 is journaled upon a hub stub shaft 98 mounted upon the front end wall 87, Figs. 5 and 3. A chain 99, Fig. 1, operably connects the sprocket 97 with a sprocket 101, Figs. 1 and 4, which has a hub 102 journaled upon a long drive shaft 103 coaxial with and for driving an auger 104—104a disposed within the auger trough 38. A driving connection is normally maintained between the sprocket 101 and the shaft 103 by a load limiting slip clutch comprising a driven element 105 connected to the shaft by a pin 106 and a driving element 107 rotatively mounted upon the shaft and having radial projections 108 meshed with axial projections 109 on the front end of the sprocket 101. A compression spring 111 maintains denticles 112 of the driving element 107 with axially projecting denticles 110 of the driven element 105 excepting under conditions of overload when these denticles are adapted to slip over one another.

The auger 104 and the drive shaft 103 are supported by a long tube 113 extending through a hole 114 in the front end wall 87 of the frame 36 and non-rotatively mounted in a tubular holder member 115 therefor which is mounted upon the rear face of said wall 87. A set of roller bearings 116 adjacent the front end of the tube rotatively support the front end of the shaft 103 while a set of roller bearings 117 in a rear end portion of the tube 113 rotatively support the rear end of the shaft 103. A spider 118 connected between a rear end portion of the shaft 103 and the auger tube 104 constrain the auger for rotation with the shaft 103. The front end of the auger tube 104 is journaled upon roller bearings 119.

Cotton bolls removed from the rows of plants by the elongated boll beater rotor 74 with the bar-like ribs 75 are raked by the transfer rotor structure 90 into the auger trough 38 where the auger 104—104a operates upon these bolls to move them rearwardly into the transfer compartment 37 where the bolls are moved by the auger 54—55 inwardly of the machine into an elevator pick-up compartment 121 for engagement by cleats 122 on an elevator belt 123 which is driven by sprockets 124 and 125, Fig. 2, for carrying the bolls upwardly through an elevator chute 126 for discharge into a vehicular receptacle (not shown).

In the operation of the apparatus the gear box driven shaft 22 is driven clockwise, as viewed in Fig. 1. Thus the shaft structure 27—31—32 is driven clockwise, as viewed from the left end in Fig. 1. Chain belt 58 is then effective for driving the sprocket 56 and the transverse auger shaft 54 clockwise, as viewed in Fig. 1. Chain belt 61, the sprockets 62 and 64 and the chain belt 65 are therefore effective to drive the cross shaft 67 clockwise, as viewed in Fig. 1, and in the direction indicated by the arrow associated with this shaft in Fig. 5. Consequently the boll transfer rotor structure 90 will be caused to rotate counter-clockwise, as viewed from the front end in Fig. 3, and is indicated by the curved arrow adjacent to the point 99 of this rotatable beater structure in Fig. 5. In Fig. 1 it can be seen that the rotor structure 74 slopes forwardly and downwardly and in Fig. 3 it can be seen that the frame wall member 41 is in opposed spaced relation laterally from the rotor structure 74 to cooperate therewith in forming a plant receiving throat TH. The plants of one row of such plants are guided into the throat TH while the adjacent row of the plants is guided into the corresponding throat TH' of the stripper unit at the opposite side of the tractor. Guiding of the plant foliage into the throat TH and TH' is facilitated by plant lifter and divider structures 130 and 131 which are illustrated in connection with the frame 36 in Figs. 1 and 4. The plant lifter and divider structure 131 in Fig. 4 has a plant lifter grille component 132 and a plant divider component 133. A grille plant lifter component 134, Fig. 1, and plant divider component 135 are constructed similarly to the lifter component 132 and the divider component 133 of the structure 131 in Fig. 4. The plant lifter and divider structures 130 and 131 are respectively connected with the front end of frame member 39, Fig. 3, and the front end wall 87 of the bifurcated frame 36, Figs. 3 and 4. Inasmuch as these structures 130 and 131 operate conventionally there is no need for further elaboration upon their structure and function.

As the machine advances through the field the beater elements adjacent the lower front ends of the rotor structures 74 and 74' will press lower portions of the plants against the walls 41 and 41' cooperating therewith in forming the throats TH and TH' and will strike against bolls upon lower portions of the plants for knocking the bolls loose from the plant. Inasmuch as the rotor structures 74 and 74' rotate clockwise and counterclockwise respectively they will tend to precipitate the removed bolls upwardly. A similar action is performed by more rearward higher elevated portions of the rotor structures 74 and 74' upon higher portions of the plants within the throats TH and TH'. The boll beater elements 75 have their edges 76 spaced apart circumferentially of the structure a sufficient distance to provide boll accommodating spaces 135 therebetween into which portions of the bolls can project to enable the beater element 75 to strike them with more effective impact.

Movement of the detached bolls into the auger troughs 38 and 38' is expedited by the boll transfer rotor structures 90 and 90' since these transfer rotor structures are rotated in the directions indicated by the arrows associated therewith in Fig. 3 so as to sweep the fingers 91 and 91' thereof from registry with the throat toward the position of registration of the auger troughs while these fingers traverse the lower half of their circular paths. The augers 104—104a and 104'—104a' driven in the manner explained above are effective for transferring the bolls rearwardly in the troughs while turbulating the bolls and causing debris to be discharged through slit-like transverse openings 136 in the bottom of the auger trough. When the bolls reach the transfer compartments 37—37' the transfer augers 54—55 and 54'—55' will advance the bolls into the compartment 121 from which they are picked up by the elevator cleats 122 and moved upwardly through the elevator chute 126.

A modified type of boll beater rotor structure is shown in Fig. 8 wherein the vanes or paddles corresponding to those designated 75 in the first embodiment are designated 75b and project directly radially of the shaft 73b corresponding to the shaft 73. Curved strut elements 134 between adjacent elements 75b are provided for bracing the latter.

In the embodiment shown in Fig. 9 the boll beater rotor structure includes a square shaft component 73c having elongated strip-like beater elements 75c extending along and secured to respective facets thereof by bolts 136. Edge portions 137 of the beater paddles 75c extend marginally beyond corresponding long edges of the shaft facets progressively circumferentially of the beater structure.

Having thus described a limited number of embodiments of the invention with the view of clearly and concisely illustrating the same, I claim:

1. In a machine for stripping bolls from field rows of cotton plants, a mobile frame having an elongated side wall having a lower edge and forming a side of a plant row receiving throat, a boll receiving conveyor generally parallel to said wall and forming an opposing wall of said throat, an elongated rotor instrumentality journalled in said frame adjacent said lower edge of said side wall, and a boll transfer and plant beater rotor structure journalled in said frame above said conveyor on an axis extending lengthwise of said throat.

2. The combination set forth in claim 1 wherein said elongated rotor instrumentality comprises fin-like boll beater paddles extending lengthwise thereof and spaced circumferentially thereof.

3. In a machine for stripping bolls from field rows of cotton plants, a mobile frame having front and rear ends and comprising an upwardly extending side wall having an elongated portion inclining upwardly and rearwardly of such frame to form a side of a plant row receiving throat which is open at the front end of such frame, a boll receiving conveyor extending lengthwise of said elongated wall portion and spaced laterally therefrom to form an opposite side of said throat, an elongated rotor instrumentality journalled in said frame within said throat in parallelism with said elongated wall portion and spaced laterally therefrom to receive the plants of a plant row between said wall portion and said instrumentality, said instrumentality being operable when rotated to knock bolls contacted thereby from plants within the throat, and a boll transfer and plant beater rotor structure journalled in said frame above said conveyor on an axis extending lengthwise of said throat.

4. The combination set forth in claim 3 wherein said boll transfer and plant beater rotor structure comprises a plurality of elongated plant beating and brushing elements projecting radially thereof and spaced apart axially thereof.

5. The combination set forth in claim 3 wherein said boll transfer and plant beater rotor structure comprises a plurality of plant beating and brushing fingers projecting radially thereof and spaced apart axially thereof, and means for rotating said structure in the direction causing movement of said fingers horizontally from the throat toward the trough pursuant to movement through the lower half of their circular path of movement about the axis of such structure.

6. In a machine for stripping bolls from field rows of cotton plants, a mobile frame having front and rear ends and comprising an upwardly extending side wall having an elongated portion inclining upwardly and rearwardly of such frame to form a side of a plant row receiving throat which is open at the front end of such frame, a boll receiving conveyor trough facing upwardly and extending lengthwise of said elongated wall portion in spaced relation laterally therefrom to form an opposite side of said throat though inclined less than said wall portion and disposed at lower elevation than rearward parts of said wall portion, auger means in said trough for conveying bolls rearwardly therein, an elongated rotor instrumentality journalled in said frame within said throat in parallelism with said elongated wall portion and spaced laterally therefrom to receive the plants of a plant row between said wall portion and said instrumentality, said instrumentality being operable when rotated to knock bolls contacted thereby from plants within the throat, and a boll transfer and plant beater rotor structure journalled in said frame above said conveyor on an axis extending lengthwise of said throat.

BENJAMIN M. HYMAN.

References Cited in the file of this patent

UNITED STATES PATENTS

| Number | Name | Date |
|---|---|---|
| 364,440 | Rohling | June 7, 1887 |
| 1,069,997 | Appleby | Aug. 12, 1913 |
| 1,237,832 | Smith | Aug. 21, 1917 |
| 2,434,124 | Schaaf et al. | Jan. 6, 1948 |
| 2,451,130 | Townsend | Oct. 12, 1948 |
| 2,491,777 | Smith | Dec. 20, 1949 |
| 2,532,065 | Hyman | Nov. 28, 1950 |
| 2,571,224 | Edwards | Oct. 16, 1951 |